(12) United States Patent
Tanase et al.

(10) Patent No.: US 11,828,895 B2
(45) Date of Patent: Nov. 28, 2023

(54) METHODS AND DEVICES USING EFFECTIVE ELASTIC PARAMETER VALUES FOR ANISOTROPIC MEDIA

(71) Applicant: GEOSOFTWARE C.V., The Hague (NL)

(72) Inventors: Catalin Tanase, Uitgeest (NL); Leonardo Quevedo, 's-Gravenhage (NL); Peter Mesdag, Delft (NL); Harry Debeye, The Hague (NL)

(73) Assignee: GEOSOFTWARE C.V., The Hague (NL)

( * ) Notice: Subject to any disclaimer, the term of this patent is extended or adjusted under 35 U.S.C. 154(b) by 588 days.

(21) Appl. No.: 16/531,726

(22) Filed: Aug. 5, 2019

(65) Prior Publication Data

US 2021/0041587 A1 Feb. 11, 2021

(51) Int. Cl.
*G01V 1/30* (2006.01)
*G01V 1/28* (2006.01)

(52) U.S. Cl.
CPC .............. *G01V 1/307* (2013.01); *G01V 1/282* (2013.01); *G01V 2210/586* (2013.01); *G01V 2210/6242* (2013.01); *G01V 2210/63* (2013.01); *G01V 2210/66* (2013.01)

(58) Field of Classification Search
CPC .. G01V 1/307; G01V 1/282; G01V 2210/586; G01V 2210/6242; G01V 2210/63; G01V 2210/66
USPC ........................................................... 702/2
See application file for complete search history.

(56) References Cited

U.S. PATENT DOCUMENTS

| 6,901,333 B2 * | 5/2005 | Van Riel | G01V 1/30 |
| | | | 702/18 |
| 9,482,773 B2 | 11/2016 | Howieson et al. | |
| 9,791,578 B2 | 10/2017 | Bianchi et al. | |
| 2015/0293245 A1 | 10/2015 | Mesdag et al. | |
| 2018/0164463 A1 * | 6/2018 | Hornby | E21B 49/00 |
| 2018/0203145 A1 * | 7/2018 | Quevedo | G01V 1/38 |
| 2019/0293815 A1 * | 9/2019 | Jocker | G01V 1/50 |

FOREIGN PATENT DOCUMENTS

| CA | 2991904 A1 * | 7/2018 | ............. G01V 1/306 |
| WO | 2015014762 A2 | 2/2015 | |

OTHER PUBLICATIONS

Andreas Ruger, "Reflection Coefficients and Azimuthal AVO Analysis in Anisotropic Media", Geophysical Monograph Series, 2002, No. 10.

(Continued)

*Primary Examiner* — Michael P Nghiem
(74) *Attorney, Agent, or Firm* — PATENT PORTFOLIO BUILDERS PLLC

(57) ABSTRACT

Methods and devices for seismic exploration of an underground formation including an orthorhombic anisotropic medium or a tilted transverse isotropic medium are provided. Isotropic-type processing techniques use effective elastic parameter values calculated based on elastic parameter values, anisotropy parameter values and azimuth angle values for the orthorhombic anisotropic medium. For the tilted transverse isotropic medium, the effective elastic parameter values depend also on the tilt angle thereof.

18 Claims, 10 Drawing Sheets

(56) References Cited

OTHER PUBLICATIONS

Faranak Mahmoudian et al., "AVAZ inversion for anisotropy parameters of a fractured medium: A physical modeling study", Crewes Research Report, 2011, pp. 1-28, vol. 23.

Ilya Tsavankin, "Anisotropic parameters and P-wave velocity for orthorhombic media", Geophysics, Jul.-Aug. 1997, pp. 1292-1309, vol. 62, No. 4.

Ilya Tsvankin, "Reflection moveout and parameter estimation for horizontal transverse isotropy", Geophysics, Mar.-Apr. 1997, pp. 614-629, vol. 62, No. 2.

Jan L. Fatti et al., "Detection of gas in sandstone reservoirs using AVO analysis: A 3-D seismic case history using the Geostack technique", Geophysics, Sep. 1994, pp. 1362-1376, vol. 59, No. 9.

John P. Castagna et al., "Offset-Dependent Reflectivity—Theory and Practice of AVO Analysis", Investigations in Geophysics, 1993, No. 8.

Keiiti Aki et al., Quantitative Seismology, Theory and Methods, vol. 1, 1980, W.H. Freeman and Company, New York, US.

Leon Thomsen, "Understanding Seismic Anisotropy in Exploration and Exploitation", 2002 Distinguished Instructor Short Course, 2002, No. 5.

Vaclav Vavrycuk et al., "PP-wave reflection coefficients in weakly anisotropic elastic media", Geophysics, Nov.-Dec. 1998, pp. 2129-2141, vol. 63, No. 6.

Yuriy Ivanov et al., "Weak-anisotropy approximation for P-wave reflection coefficient at the boundary between two tilted transverely isotropic media", Geophysical Prospecting, 2016, pp. 1-18.

Extended European Search Report for corresponding/related European Application No. 20305752.6 dated Dec. 16, 2020.

Ivanov, Y., et al., "Weak-anisotropy Approximation for P-wave Reflection Coefficient at the Boundary between Two TTI Media," 77th EAGE Conference & Exhibition 2015, IFEMA Madrid, Spain, Jun. 1-4, 2015, 5 pages.

Rüger, A., "Variation of P-wave reflectivity with offset and azimuth in anisotropic media," Geophysics, vol. 63, No. 3, May-Jun. 1998, pp. 935-947.

Office Action in related/corresponding European Application No. 20 305 752.6 dated Aug. 5, 2022.

Office Action in related/corresponding European Application No. 20 305 752.6 dated Aug. 2, 2023.

* cited by examiner

METHODS AND DEVICES USING EFFECTIVE ELASTIC PARAMETER VALUES FOR ANISOTROPIC MEDIA

BACKGROUND

Technical Field

Embodiments of the subject matter disclosed herein generally relate to methods and devices for seismic data modeling and inversion for anisotropic media and, more particularly, to using isotropic-type processing with effective elastic parameter values based on anisotropy and elastic parameter values.

Discussion of the Background

Seismic data is routinely acquired to obtain information about subsurface structure, stratigraphy, lithology and fluids contained in underground formations (sometimes called simply "earth"). Seismic data is a term used for recordings of an underground structure's response to seismic waves (also called "acoustic waves"). The seismic waves are reflected in underground formations at locations of changes in earth properties that impact the seismic wave propagation.

Modeling is used to gain understanding of seismic wave propagation and to help analyze seismic data. In modeling, seismic responses are estimated using models of earth properties and seismic wave propagation modeling algorithms. Models of earth properties are often specified in terms of physical parameters. For example, modeling methods are widely used to study changes in seismic reflection amplitudes with the changing angle of incidence of a plane wave reflecting from a flat interface as described in the article by Castagna, J. P., and Backus, M. M., "Offset-dependent reflectivity—Theory and practice of AVO analysis," published in *Investigations in Geophysics Series No. 8*, 1993, Society of Exploration Geophysicists (incorporated herewith by reference in its entirety). In this article, two half-spaces above and below an interface are assumed to be homogeneous and isotropic so that each half-space can be described with just three earth parameters, e.g., p-wave velocity, s-wave velocity and density. In practice, alternative triplets of parameters may be used, e.g., p-wave impedance, s-wave impedance and density. These parameters are referred to as elastic parameters. In some cases, modeling methods start from other earth parameters, and the transforms to elastic parameters are included as part of the modeling.

In seismic modeling (often referred to as "forward modeling"), a source seismic wavelet may be used to model the earth response. In an opposite process to forward modeling called "inverse modeling" or "inversion," earth parameters are estimated based on the measured seismic responses, and an estimate of the source seismic wavelet. Inversion methods are generally based on forward models of seismic wave propagation, and some make use of some input elastic parameter data such as low frequency trend information or statistical distributions. Other inversion methods use some calibration of seismic amplitudes, performed in a pre-processing step or as part of an algorithm. Dependent on the seismic data acquisition geometries, estimates of earth properties obtained from the inversion methods are generally provided as a series of 2D sections or 3D volumes of elastic parameter values. Inversion is often followed by analysis and interpretation of the inversion results. Available borehole log measurements may be used during the analysis and interpretation.

Local isotropy is a core assumption of most conventional methods for forward modeling, wavelet estimation, inversion, analysis and interpretation of inversion results, as well as analysis and interpretation of seismic data. Local isotropy assumption considers the earth (i.e., the underground formation) to be a stack of layers, with each layer being described by a physical parameter or property with the same value when measured in different directions. Such methods are referred to hereinafter as "isotropic" methods.

In reality, the layers are generally anisotropic, with the acquired seismic data embedding the effects of anisotropy. Seismic data affected by the anisotropy is called "anisotropic seismic data." Earth parameters that describe anisotropy are referred to as anisotropy parameters. Anisotropy has to be taken into consideration in order to improve the accuracy of seismic modeling, wavelet estimation, inversion, and the analysis and interpretation of inversion results for anisotropic seismic data. Ruger's monography, "Reflection Coefficients and Azimuthal AVO Analysis in Anisotropic Media," *Geophysical Monograph Series No. 10*, Society of Exploration Geophysicists, and Thomsen's article, "Understanding Seismic Anisotropy in Exploration and Exploitation," published in *Distinguished Instructor Series No. 5*, Society of Exploration Geophysicists/European Association of Geoscientists and Engineers (incorporated herewith by reference in their entirety) describe some approaches for handling anisotropy.

Taking into consideration anisotropy makes seismic processing mathematically and numerically more complex than similar isotropic methods. Modeling methods (such as wavelet estimation and certain types of seismic data analysis and interpretation) must also be expanded to incorporate the anisotropy parameters, which makes them more challenging to use. Moreover, from the inversion perspective, explicit incorporation of anisotropy parameters is difficult. Performing inversion for the elastic parameters from amplitude-variation with offset (AVO) seismic data is recognized to be a difficult problem for most seismic data acquisition geometries. If the anisotropy parameters are also included in inversion, the number of unknown values increases, making it even harder to find a solution. Adding more parameters and coping with such difficulties also complicates the analysis and interpretation of inversion results.

U.S. Pat. No. 6,901,333 and WO 2015/014762 (which are incorporated herein by reference) describe techniques for generating anisotropic elastic parameters (here called effective elastic parameters for anisotropic medium) which are used in isotropic modeling and isotropic inversion algorithms in particular anisotropic media: vertically transverse isotropic (VTI) media, which possess polar anisotropy characteristics, and horizontally transverse isotropic (HTI) media, which possess azimuthal anisotropy characteristics. However, underground formations may not be characterized by HTI or VTI anisotropy, being instead tilted transverse isotropic (TTI) and/or orthorhombic anisotropy (which are more general anisotropy types than VTI and HTI).

There is a need to develop methods and devices that incorporate and generate anisotropic (effective) elastic parameters in seismic modeling, wavelet estimation, inversion and the like, as well as analysis and interpretations of results for seismic data acquired over azimuthally anisotropic media such as TTI and orthorhombic.

SUMMARY

Various embodiments for modeling and seismic data inversion related to underground formation including anisotropic media use effective elastic parameter values based on anisotropy and elastic parameter values. Take into consideration anisotropy effects in this manner allows an efficient and accurate processing for orthorhombic and tilted transverse isotropic (TTI) media. Not taking into consideration the anisotropy effects may cause a significant error in locating hydrocarbon reservoirs.

According to an embodiment, there is a method for seismic exploration of an underground formation including an orthorhombic anisotropic medium. The method includes obtaining seismic data acquired for the underground formation, wherein the seismic data includes seismic amplitudes detected at plural values of an azimuth angle, $\omega-\varphi$, of a source-receiver direction relative to a principal axis of the orthorhombic anisotropic medium. The method further includes calculating elastic parameter values and anisotropy parameter values related to the orthorhombic anisotropic medium based on the seismic data, and performing an isotropic-type processing technique using effective elastic parameter values calculated based on the elastic parameter values, the anisotropy parameter values, and the azimuth angle for the orthorhombic anisotropic medium. The isotropic-type processing technique leads to a quantitative model of the underground formation usable to locate hydrocarbon reservoirs.

According to another embodiment, there is a method for seismic exploration of an underground formation including a tilted transverse isotropic, TTI, medium having a symmetry axis tilted at a tilt angle r relative to a horizontal plane thereof. The method includes obtaining seismic data acquired for the underground formation, wherein the seismic data includes seismic amplitudes detected at plural values of an azimuth angle, $\omega-\varphi$, of a source-receiver direction relative to a projection of the symmetry axis in a horizontal plane. The method further includes calculating elastic parameter values and anisotropy parameter values related to the TTI medium based on the seismic data, and performing an isotropic-type processing technique using effective elastic parameter values calculated based on the elastic parameter values, the anisotropy parameter values, the values of the azimuth angle and of the tilt angle for the TTI medium. The isotropic-type processing technique leads to a quantitative model of the underground formation usable to locate hydrocarbon reservoirs.

According to yet another embodiment, there is a seismic data processing apparatus for exploration of an underground formation. The apparatus includes an interface configured to obtain seismic data acquired for the underground formation, wherein the seismic data includes seismic amplitudes detected at plural values of an azimuth angle, $\omega-\varphi$, of a source-receiver direction relative to (1) a principal axis of the orthorhombic anisotropic medium if the underground formation includes an orthorhombic anisotropic medium, or (2) relative to a projection of a symmetry axis in a horizontal plane, if the underground formation includes a tilted transverse isotropic, TTI, medium having a symmetry axis tilted at a tilt angle $\tau$ relative to an isotropy plane thereof. The apparatus also includes a central processing unit connected to the interface and configured (A) to calculate elastic parameter values and anisotropy parameter values related to the orthorhombic anisotropic medium or to the TTI medium based on the seismic data, and (B) to perform an isotropic-type processing technique using effective elastic parameter values calculated based on the elastic parameter values, and the anisotropy parameter values and the azimuth angle. The isotropic-type processing technique leads to a quantitative model of the underground formation usable to locate hydrocarbon reservoirs, and the effective elastic parameter values depend also on the tilt angles for TTI medium.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data processing for exploring underground structures, which maximizes the information associated with parameter variations and extracted from seismic data acquired with a given set of source-receiver pairs.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Methods and devices that process seismic data taking into account the effects of anisotropy associated with tilted transverse isotropic (TTI) and orthorhombic media (i.e., subsurface layers being imaged which possess azimuthal anisotropy) according to various embodiments are describes in this section. In some embodiments, earth elastic and anisotropy parameters associated with TTI and orthorhombic media are converted into anisotropic parameters used in isotropic seismic data processing such as, but not limited to, seismic modeling, wavelet estimation, inversion, the analysis and interpretation of inversion results, and the analysis and interpretation of seismic data.

Figure 1:
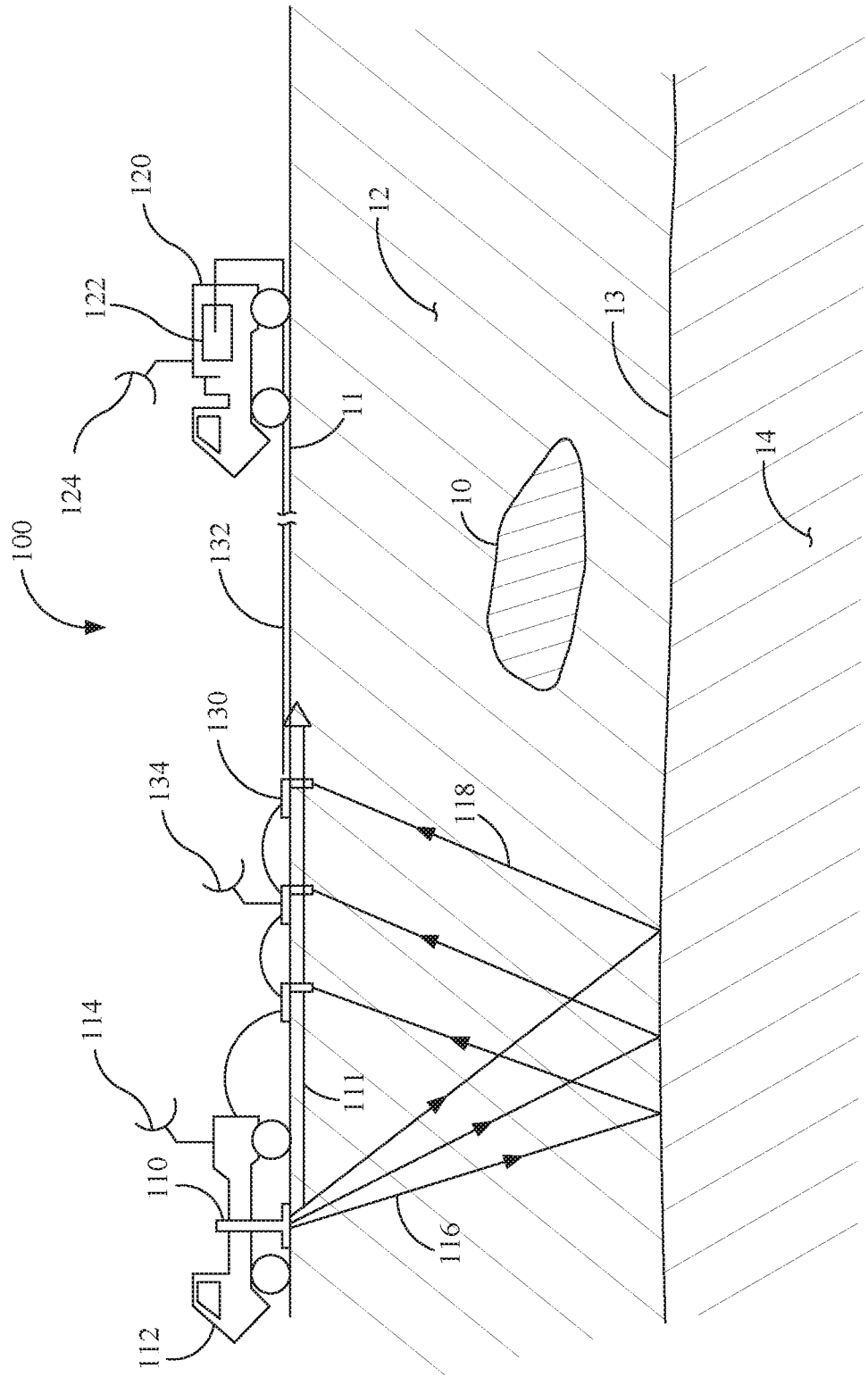
FIG. 1 is an illustration of a seismic data acquisition system.

Prior to discussing such embodiments in detail, consider system 100 for land seismic data acquisition illustrated in FIG. 1. This system is configured to generate, transmit and receive seismic waves thereby exploring underground formations. Such exploration may determine the absence or presence of hydrocarbon deposits (such as 10 in sediment layer 12) or at least the probability of the absence or presence of hydrocarbon deposits underground.

System 100 includes a seismic wave source 110, which may be a vibrator moved to different locations by the first vehicle/truck 112. The seismic source generates seismic waves. Some of the seismic waves' energy is detected by receivers 130 (e.g., geophones). The receivers convert the detected waves into electrical signals recorded by seismic data acquisition system 120 (which can be located, for example, on vehicle/truck 122). Source 110, receivers 130, and data acquisition system 120 are placed on ground surface 11 and are interconnected by one or more cables 132.

In FIG. 1, there is a single seismic source with a single vibrator, but more sources and vibrators may be used. Vehicle 122 may communicate wirelessly with vehicle 112 via antenna 124 and 114, respectively. Antenna 134 may facilitate wireless communications of the receivers with vehicles 112 and 122.

Seismic waves generated by source 110 propagate on the ground surface 11 as surface wave 111 and underground as transmitted waves 116. The transmitted waves are partially reflected at interface 13 between layers 12 and 14 (which have different wave propagation properties) as reflected waves 118. The surface and the reflected waves may be detected by receivers 130 that convert the detected seismic energy into an electrical signal. The electrical signal represents both reflected waves and surface waves, which are undesirable and filtered out as much as is practically possible during seismic data processing. Data acquisition system 120 samples the electrical signals, yielding a series of sample amplitude versus time, which is the seismic data.

FIG. 1 illustrates a linear land data acquisition. However, receivers may be placed on a survey area enabling data acquisition for different azimuth angles (i.e., different angles of source-receiver direction relative to a reference direction) as illustrated, for example, in U.S. Pat. No. 9,791,578.

In marine environment, seismic data acquired with streamer spreads towed yields at least a narrow range of azimuth angles. This limited range may be extended by using an assembly of vessels as described, for example, in U.S. Pat. No. 9,482,773, of by placing a seismic source in a middle of a streamer spread.

Figure 2:
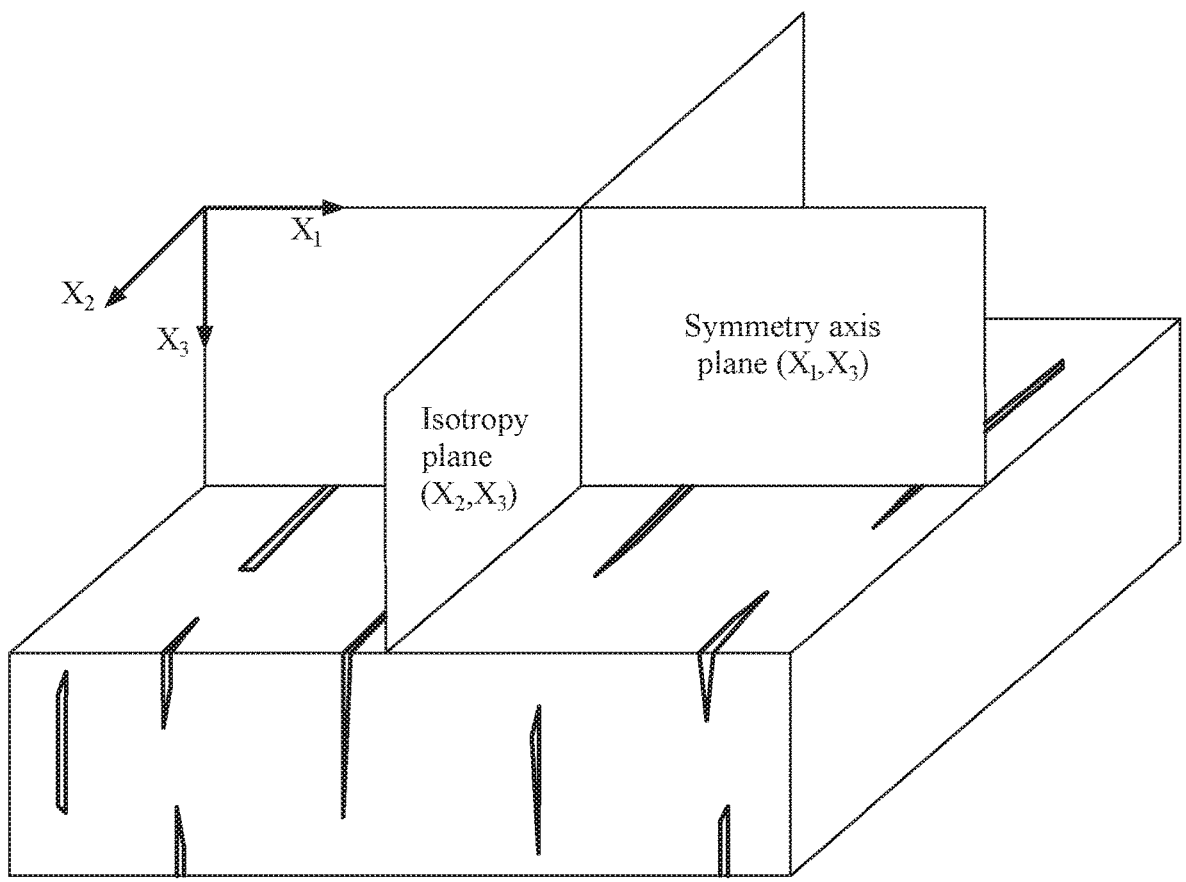
FIG. 2 schematically illustrates an HTI model with the asymmetry being caused by a system of vertical parallel cracks.
Figure 3:
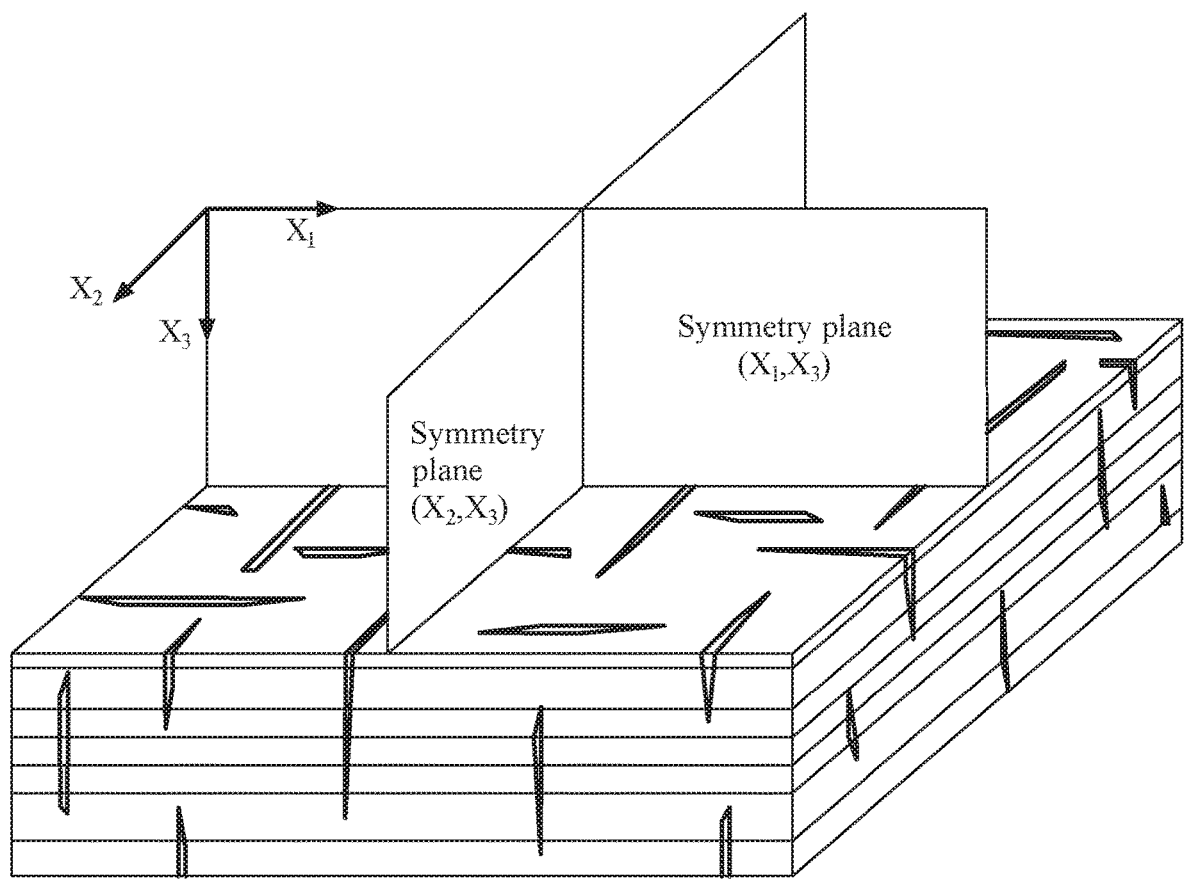
FIG. 3 schematically illustrates an orthorhombic model with the asymmetry being caused by two orthogonal systems of parallel cracks and thin horizontal layering.

FIG. 2 illustrates an HTI medium with vertical fractures that are substantially parallel with an isotropy plane and substantially perpendicular to symmetry axes in a symmetry plane. FIG. 3 illustrates an orthorhombic medium with two orthogonal systems of parallel fractures, thus having two vertical symmetry planes. FIGS. 2 and 3 are adapted from 1997 article "Anisotropic parameters and P-wave velocity for orthorhombic media" by Tsvankin, I. published in Geophysics, vol. 62, no. 4, pp. 1292-1309.

Figure 4B:
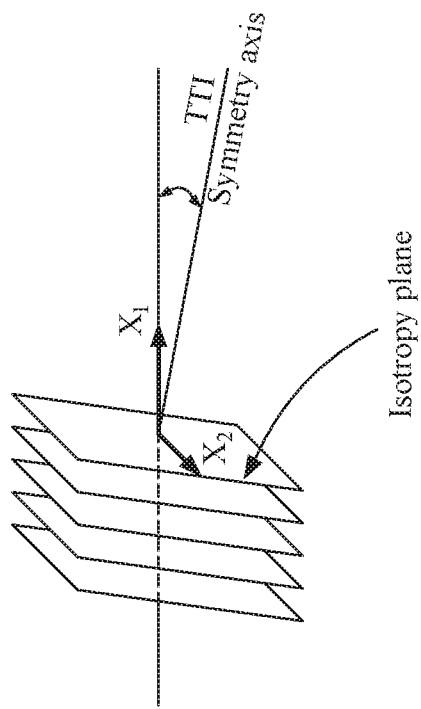
FIGS. 4A and 4B illustrate a VTI and a TTI model, respectively.
Figure 4A:
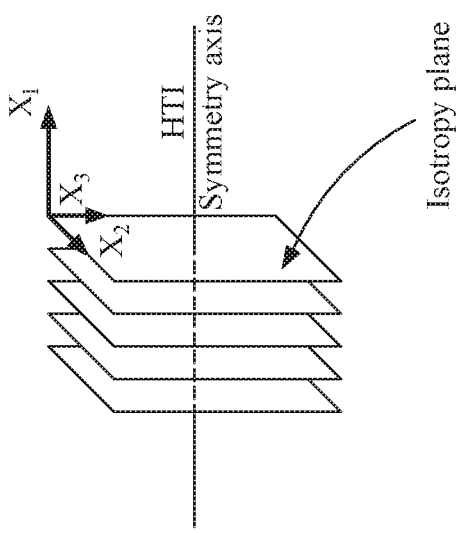

FIG. 4A illustrates HTI and FIG. 4B illustrates TTI. Different from HTI, in TTI the symmetry axis is tilted with respect to a horizontal plane by a given angle τ.

Figure 5:
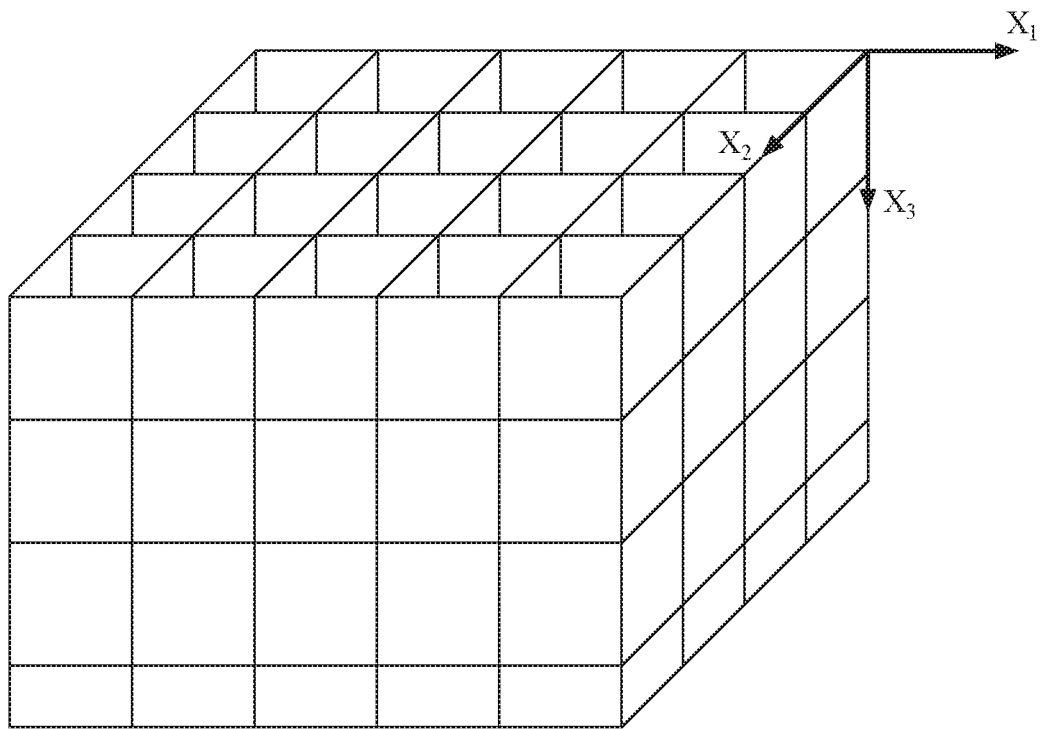
FIG. 5 illustrates an orthorhombic medium with orthogonal symmetry planes, having a horizontal symmetry plane (x1, x2) and the other two planes (x2,x3) and (x1,x3) being vertical.

FIG. 5 illustrates another example of an anisotropic medium. The illustrated orthorhombic medium's anisotropy is caused by two orthogonal systems of vertical parallel cracks and also by a horizontal fine layering. For this medium, three symmetry planes are orthogonal to one another, with one symmetry plane being horizontal and the other two being vertical. Both TTI and orthorhombic media (also known as media with azimuthal anisotropy) are frequently associated with cracks, fractures and stress that occur in underground formations where regional differential horizontal stress is the dominant stratification factor.

In seismic data, important information about earth elastic and anisotropy parameters is embedded in the change of seismic amplitudes as a function of the separation between sources and receivers (a feature known as Amplitude Versus Offset AVO). AVO may be converted, for example, to angles for Amplitude Versus Angle (AVA) analysis and interpretation. Rather than studying the data at the level of records, partial stacks of records are sometimes used to reduce the amount of data and improve robustness while retaining the structural information embedded in the amplitude changes with offset, angle or other parameters.

The link between the subsurface parameters and AVO is determined by seismic wave propagation modeling. For the most general case, this leads to a very complex relationship that can only be solved by numerical wave equation modeling. Most conventional modeling methods are based on a simplified wave propagation model. For example, the following assumption has been used to define a simplified seismic wave propagation model: the earth (i.e., underground formation) is stratified into isotropic parallel layers; seismic waves propagate as plane waves impinging on each interface at a constant angle; each interface acts as an independent reflector; transmission effects other than ray bending are neglected; and the calculated plane wave reflection coefficients assume that half-spaces above and below the reflector interface are isotropic. Even with this very simple model of the earth and of wave propagation, the resulting Zoeppritz equations that describe the AVO relationship are quite complex, making it necessary (for practical reasons) to approximate the Zoeppritz equations. The 3-term Aki-Richards, the 3-term Shuey (which is a rearrangement of the Aki-Richards equation) and 2-term Shuey approximations have been used to approximate the Zoeppritz equations. Conventional seismic AVO inversion methods are based on these forward modeling equations or the Zoeppritz equations.

The following embodiments use effective elastic parameters for anisotropic medium. The effective elastic parameters, which are based on the anisotropy parameters and the elastic parameters, are used in the isotropic-type techniques applied to the seismic data. These effective elastic parameters take into consideration azimuthal anisotropy to an acceptable level of accuracy.

It is well-known (as described, for example, in "Reflection Coefficients and Azimuthal AVO Analysis in Anisotropic Media" by Ruder, A. published in *Geophysical Monograph Series* No. 10, SEG, 2002) how to incorporate anisotropy in AVO modeling (i.e., generalizing the isotropic modeling to model plane wave reflection in the case of anisotropic media). Similar to the approximation of the Zoeppritz equations by the 3-term Aki-Richards or Shuey equations, a convenient approximation to the AVO relationship can be obtained for the AVO plane wave reflection coefficients on a flat interface bounded by anisotropic half-spaces. The 3-term approximation of the Zoeppritz PP reflectivity is given by:

$$R_P(\theta) = R_0 + R_2 \sin^2\theta + R_4 \sin^2\theta \tan^2\theta \qquad (1)$$

where θ is the incidence angle, while the intercept $R_0$, gradient $R_2$ and curvature $R_4$ coefficients are defined by the elastic parameters, Thomsen parameters and the orientation of the anisotropic media with respect to the source-receiver direction.

The effective elastic parameters $V_P^{eff}$, $V_S^{eff}$, and $\rho^{eff}$ are defined such that the PP reflectivity coefficients have an identical form to the isotropic media case of Aki-Richards (see Aki, K. T., and Richards, P. G., "Quantitative Seismology: Theory and Methods," Vol. 1, published in 1980 by W.H. Freeman and Co., page 153) when expressed in terms of the anisotropic elastic parameters:

$$R_0 = \frac{1}{2}\left(\frac{\Delta V_P^{eff}}{V_P^{eff}} + \frac{\Delta \rho^{eff}}{\rho^{eff}}\right) \quad (2)$$

$$R_2 = \frac{1}{2}\left(\frac{\Delta V_P^{eff}}{V_P^{eff}} - 4K\frac{\Delta G^{eff}}{G^{eff}}\right) \quad (3)$$

$$R_4 = \frac{1}{2}\frac{\Delta V_P^{eff}}{V_P^{eff}} \quad (4)$$

where $G^{eff} = \rho^{eff}(V_S^{eff})^2$ is the anisotropic shear modulus.

An expression for the PP reflectivity for orthorhombic medium is given by the following expressions:

$$R_0 = \frac{1}{2}\left(\frac{\Delta V_P}{V_P} + \frac{\Delta \rho}{\rho}\right) \quad (5)$$

$$R_2 = \frac{1}{2}\left(\frac{\Delta V_P}{V_P} - 4K\frac{\Delta G^{\|}}{G^{\|}} + \Delta \Gamma^* + \Delta \delta^*\right) \quad (6)$$

$$R_4 = \frac{1}{2}\frac{V_P}{V_P} + \Delta \epsilon^* \quad (7)$$

where $V_P$ is P-velocity along the vertical direction, $G^{\|} = \rho(V_S^{\|})^2$ is the vertical shear modulus that corresponds to the shear wave with polarization parallel to $(x_2,x_3)$ plane, $V_S^{\|}$ is the reference shear velocity along the vertical direction, $\rho$ is density, $$K = \left(\frac{\bar{V}_S}{\bar{V}_P}\right)$$

with $\bar{V}_P$ and $\bar{V}_S$ being the above and below averages across the interface for the reference velocities. Further, for the orthorhombic case $$\epsilon^* = \epsilon^{(2)}\cos^4(\omega-\varphi) + (\delta^{(3)} + 2\epsilon^{(2)})\cos^2(\omega-\varphi)\sin^2(\omega-\varphi) + \epsilon^{(1)}\sin^4(\omega-\varphi) \quad (8)$$

$$\delta^* = \delta^{(2)}\cos^2(\omega-\varphi) + \delta^{(1)}\sin^2(\omega-\varphi) \quad (9)$$

$$\Gamma^* = 8K\gamma^{(3)} \quad (10)$$

where $\varphi$ is the azimuth of the $x_1$ principal axis (relative to an arbitrary reference), $\omega$ is the azimuth of the source-receiver direction (relative to the same reference), while the Thomsen parameters are defined in following Table 1, where $c_{ij}$ (with i, j=1, 2, 3, 4, 5, 6) denotes stiffness matrix components.

TABLE 1

| Thomsen Parameter | $\epsilon$ | $\delta$ | $\gamma$ |
|---|---|---|---|
| $(x_2, x_3)$ plane | $\epsilon^{(1)} = \frac{c_{22} - c_{33}}{2c_{33}}$ | $\delta^{(1)} = \frac{(c_{23} + c_{44})^2 - (c_{33} - c_{44})^2}{2c_{33}(c_{33} - c_{44})}$ | |
| $(x_1, x_3)$ plane | $\epsilon^{(2)} = \frac{c_{11} - c_{33}}{2c_{33}}$ | $\delta^{(2)} = \frac{(c_{13} + c_{55})^2 - (c_{33} - c_{55})^2}{2c_{33}(c_{33} - c_{55})}$ | $\gamma^{(2)} = \frac{c_{66} - c_{44}}{2c_{44}}$ |
| $(x_1, x_2)$ plane | | $\delta^{(3)} = \frac{(c_{12} + c_{66})^2 - (c_{11} - c_{66})^2}{2c_{11}(c_{11} - c_{66})}$ | $\gamma^{(2)} = \frac{c_{44} - c_{55}}{2c_{55}}$ |

The effective elastic parameters in orthorhombic media are derived in the following manner. From equation (7) for the curvature term $R_4$ $$\frac{\Delta V_P^{eff}}{V_P^{eff}} = \frac{\Delta V_P}{V_P} + \Delta \epsilon^* \quad (11)$$

and from equation (5) for intercept $R_0$ $$\frac{\Delta \rho^{eff}}{\rho^{eff}} = \frac{\Delta \rho}{\rho} - \Delta \epsilon^* \quad (12)$$

which, when substituted in equation (6), gives the gradient term $R_2$ $$\frac{\Delta V_{S\|}^{eff}}{V_{S\|}^{eff}} = \frac{\Delta V_{S\|}}{V_{S\|}} + \frac{4K+1}{8K}\Delta\epsilon^* - \frac{1}{8K}\Delta\Gamma^* - \frac{1}{8K}\Delta\delta^*. \quad (13)$$

In the small contrast limit, integrating differential equations (11), (12) and (13) yield the following formulas for the anisotropic elastic parameters:

$$\ln V_P^{eff} = \ln V_P + \epsilon^* \quad (14)$$

$$\ln \rho^{eff} = \ln \rho - \epsilon^* \quad (15)$$

$$\ln V_{S\|}^{eff} = \ln V_{S\|} + \frac{(4K+1)\epsilon^* - \Gamma^* - \delta^*}{8K}. \quad (16)$$

Equivalent to equations (14), (15) and (16), effective elastic parameters in an orthorhombic case may use P-impedance $(I_P)$ and S-impedance $(I_S)$ in addition to density $(\rho)$, for seismic inversion:

$$\ln I_P^{eff} = \ln I_P \tag{17}$$

$$\ln I_{S\|}^{eff} = \ln I_{S\|} + \frac{(1-4K)\epsilon^* - \Gamma^* - \delta^*}{8K} \tag{18}$$

$$\ln \rho^{eff} = \ln \rho - \epsilon^*. \tag{19}$$

Table 2 lists Thomsen parameters for the particular cases of HTI and VTI.

| Thomsen parameter | HTI | VTI |
|---|---|---|
| $\epsilon^{(1)}$ | 0 | $\epsilon \approx -\epsilon^{(V)}$ |
| $\epsilon^{(2)}$ | $\epsilon^{(V)}$ | $\epsilon \approx -\epsilon^{(V)}$ |
| $\delta^{(1)}$ | 0 | $\delta \approx \delta^{(V)} - 2\epsilon^{(V)}$ |
| $\delta^{(2)}$ | $\delta^{(V)}$ | $\delta \approx \delta^{(V)} - 2\epsilon^{(V)}$ |
| $\delta^{(3)}$ | $\delta^{(V)} - 2\epsilon^{(V)}$ | 0 |
| $\gamma^{(2)}$ | $\gamma^{(V)}$ | $\gamma \approx -\gamma^{(V)}$ |
| $\gamma^{(3)}$ | $-\gamma^{(V)}$ | 0 |

The substitution of HTI Thomsen parameters from Table 2 into the general expressions (8), (9) and (10) yields the following equations valid in the HTI case:

$$\epsilon^* = \epsilon^{(V)} \cos^4(\omega-\varphi) + \delta^{(V)} \cos^2(\omega-\varphi)\sin^2(\omega-\varphi) \tag{20}$$

$$\delta^* = \delta^{(V)} \cos^2(\omega-\varphi) \tag{21}$$

$$\Gamma^* = -8K\gamma^{(V)} \cos^2(\omega-\varphi) \tag{22}$$

Further substituting equations (20), (21) and (22) into the expressions (14), (15) and (16) gives for the effective elastic parameters in the HTI case:

$$V_P^{eff} = \delta_r^{\cos^2(\omega-\phi)} \left(\frac{\epsilon_r}{\delta_r}\right)^{\cos^4(\omega-\phi)} V_P \tag{23}$$

$$\rho^{eff} = \delta_r^{-\cos^2(\omega-\phi)} \left(\frac{\epsilon_r}{\delta_r}\right)^{-\cos^4(\omega-\phi)} \rho \tag{24}$$

$$V_{S\|}^{eff} = (\gamma_r \delta_r^{0.5})^{\cos^2(\omega-\varphi)} (\epsilon_r/\delta_r)^{((4K+1)/8K)\cos^4(\omega-\varphi)} V_{S\|} \tag{25}$$

where $\epsilon_r$, $\delta_r$ and $\gamma_r$ are defined by $$\ln \epsilon_r = \epsilon^{(V)} \tag{26}$$

$$\ln \delta_r = \delta^{(V)} \tag{27}$$

$$\ln \gamma_r = \gamma^{(V)}. \tag{28}$$

As in the orthorhombic case, the reflectivity expressions for TTI media (see FIG. 4) are derived from the general anisotropic expression for PP wave reflectivity.

$$R_0 = \frac{1}{2}\left(\frac{\Delta V_P}{V_P} + \Delta \alpha_r^*(\tau) + \frac{\Delta \rho}{\rho}\right) \tag{29}$$

$$R_2 = \frac{1}{2}\left(\frac{\Delta V_P}{V_P} + \Delta \alpha_r^*(\tau) - 4K\frac{\Delta G^\|}{G^\|} - \right.$$
$$\left. 4Kg_r^*(\tau) + \Delta\Gamma^*(\tau, \varphi, \omega) + \Delta\delta^*(\tau, \varphi, \omega)\right) \tag{30}$$

$$R_4 = \frac{1}{2}\left(\frac{\Delta V_P}{V_P} + \Delta \alpha_r^*(\tau) + \Delta\epsilon^*(\tau, \varphi, \omega)\right) \tag{31}$$

where $V_P$ is the P-velocity as referenced within the isotropy symmetry plane, $G^\|$ is the shear modulus $G^\| = \rho(V_S^\|)^2$, $V_S^\|$ is the reference shear velocity that corresponds to the fast shear wave as defined within the isotropy symmetry plane, $\rho$ is density, $K = (\overline{V_S}/\overline{V_P})^2$ with $\overline{V_S}$ and $\overline{V_P}$ being the above and below averages across the interface for the reference velocities. Further, $$\alpha_r^*(\tau) = \delta^{(V)} (\sin \tau)^2 + (\epsilon^{(V)} - \delta^{(V)})(\sin \tau)^4 \tag{32}$$

$$g_r^*(\tau) = 2\gamma^{(V)} (\sin \tau)^2 \tag{33}$$

where $\tau$ is the tilt angle between the symmetry axis and the horizontal plane (see FIG. 4). The functions $\epsilon^*(\tau,\varphi,\omega)$, $\delta^*(\tau,\varphi,\omega)$ and $\Gamma^*(\tau,\varphi,\omega)$ are similar to the ones in formula (8), (9) and (10) but also depend on the tilt angle $\tau$. Note that here the $\varphi$ is the azimuth angle of the projection of the symmetry axis in a horizontal plane.

$$\epsilon^{(1)}(\tau) = -(\delta^{(V)}(\cos\tau)^2 + \epsilon^{(V)}(\sin\tau)^2)(\sin\tau)^2 \tag{34}$$

$$\epsilon^{(2)}(\tau) = \epsilon^{(V)} \cos 2\tau \tag{35}$$

$$\delta^{(1)}(\tau) = -[\epsilon^{(V)} + (\delta^{(V)} - \epsilon^{(V)})\cos 2\tau](\sin\tau)^2 \tag{36}$$

$$\delta^{(2)}(\tau) = \epsilon^{(V)}\cos 2\tau + (\delta^{(V)} - \epsilon^{(V)})\cos 4\tau \tag{37}$$

$$\delta^{(3)}(\tau) = -[\epsilon^{(V)} - (\delta^{(V)} - \epsilon^{(V)})\cos 2\tau](\cos\tau)^2 \tag{38}$$

$$\gamma^{(3)}(\tau) = \left(-\gamma^{(v)} + \frac{1}{K}(\delta^{(V)} - \epsilon^{(V)})(\sin\tau)^2\right)(\cos\tau)^2. \tag{39}$$

Formulas for the reflectivity coefficient were written by choosing the reference velocities within the isotropy plane. In turn, these formulas could be equivalently rewritten by choosing the reference P- and S-velocities along the anisotropic symmetry axis, by defining the so-called VTI reference system. In the VTI reference system, the reference p-wave $\tilde{V}_P$ and s-wave $\tilde{V}_S$ velocities are defined along the symmetry axis, and tilt angle $\tilde{\tau}$ of the symmetry axis is defined with respect to the vertical, i.e. $\tilde{\tau} = 90° - \tau$.

$$R_0 = \frac{1}{2}\left(\frac{\Delta \tilde{V}_P}{\tilde{V}_P} + \Delta \tilde{\alpha}_r^*(\tilde{\tau}) + \frac{\Delta \rho}{\rho}\right) \tag{40}$$

$$R_2 = \frac{1}{2}\left(\frac{\Delta \tilde{V}_P}{\tilde{V}_P} + \Delta \tilde{\alpha}_r^*(\tilde{\tau}) - 4K\frac{\Delta \tilde{G}}{\tilde{G}} - \right.$$
$$\left. 4K \tilde{g}_r^*(\tilde{\tau}) + \Delta\Gamma^*(\tilde{\tau}, \varphi, \omega) + \Delta\delta^*(\tilde{\tau}, \varphi, \omega)\right) \tag{41}$$

$$R_4 = \frac{1}{2}\left(\frac{\Delta \tilde{V}_P}{\tilde{V}_P} + \Delta \tilde{\alpha}_r^*(\tilde{\tau}) + \Delta\epsilon^*(\tilde{\tau}, \varphi, \omega)\right) \tag{42}$$

where $\tilde{G} = \rho \tilde{V}_S^2$ is the shear modulus, and $$\tilde{\alpha}_r^*(\tilde{\tau}) = \delta(\sin \tilde{\tau})^2 + (\epsilon - \delta)(\sin \tilde{\tau})^4 \tag{43}$$

$$\tilde{g}_r^*(\tilde{\tau}) = 2\gamma(\sin \tilde{\tau})^2. \tag{44}$$

Here, the tilt angle $\tilde{\tau}$ is the angle between the symmetry axis and the vertical direction. The functions $\epsilon^*(\tilde{\tau},\varphi,\omega)$, $\delta^*(\tilde{\tau},\varphi,\omega)$ and $\Gamma^*(\tilde{\tau},\varphi,\omega)$ are given by formula similar with (34)-(39):

$$\epsilon^{(1)}(\tilde{\tau}) = (\epsilon + (\epsilon - \delta)(\sin\tilde{\tau})^2)(\cos\tilde{\tau})^2 \tag{45}$$

$$\epsilon^{(2)}(\tilde{\tau}) = \epsilon\cos 2\tilde{\tau} \tag{46}$$

-continued $$\delta^{(1)}(\tilde{\tau}) = [\epsilon + (\delta - \epsilon)\cos 2\tilde{\tau}](\cos\tilde{\tau})^2 \quad (47)$$

$$\delta^{(2)}(\tilde{\tau}) = \epsilon\cos 2\tilde{\tau} + (\delta - \epsilon)\cos 4\tilde{\tau} \quad (48)$$

$$\delta^{(3)}(\tilde{\tau}) = -[\epsilon - (\delta - \epsilon)\cos 2\tilde{\tau}](\sin\tilde{\tau})^2 \quad (49)$$

$$\gamma^{(3)}(\tilde{\tau}) = \left(\gamma + \frac{1}{K}(\delta - \epsilon)\right)(\sin\tilde{\tau})^2. \quad (50)$$

Thus, the anisotropic effective elastic parameters for TTI media with VTI reference convention are:

$$\ln \tilde{V}_P^{eff} = \ln \tilde{V}_P + \epsilon^*(\tilde{\tau},\varphi,\omega) + \Delta\tilde{\alpha}_r^*(\tilde{\tau}) \quad (51)$$

$$\ln \tilde{\rho}^{eff} = \ln \rho - \epsilon^*(\tilde{\tau},\varphi,\omega) \quad (52)$$

$$\ln \tilde{V}_S^{eff} = \ln \tilde{V}_S + 1/8K[(4K+1)\epsilon^*(\tilde{\tau},\varphi,\omega) - \Gamma^*(\tilde{\tau},\varphi,\omega) - \delta^*(\tilde{\tau},\varphi,\omega) + 4K\tilde{g}_r^*(\tilde{\tau})]. \quad (53)$$

Effective elastic parameters in the TTI case may use P-impedance ($I_P$) and S-impedance ($I_S$) in addition to density ($\rho$), for seismic inversion, yielding the following formulas that are equivalent to equations (51), (52) and (53):

$$\ln \tilde{I}_P^{eff} = \ln I_P + \tilde{\alpha}_r^*(\tilde{\tau}) \quad (54)$$

$$\ln \tilde{I}_S^{eff} = \ln I_S + \frac{1}{8K}[(1-4K)\epsilon^*(\tilde{\tau},\varphi,\omega) - \Gamma^*(\tilde{\tau},\varphi,\omega) - \delta^*(\tilde{\tau},\varphi,\omega) + 4K\tilde{g}_r^*(\tilde{\tau})] \quad (55)$$

$$\ln \tilde{\rho}^{eff} = \ln\rho - \epsilon^*(\tilde{\tau},\varphi,\omega). \quad (56)$$

In the particular case of VTI media $\tilde{\tau}=0$ and therefore $$\tilde{\alpha}_r^* = 0 \quad (57)$$

$$\tilde{g}_r^* = 0 \quad (58)$$

$$\epsilon^{(1)} = \epsilon \quad (59)$$

$$\epsilon^{(2)} = \epsilon \quad (60)$$

$$\delta^{(1)} = \delta \quad (61)$$

$$\delta^{(2)} = \delta \quad (62)$$

$$\delta^{(3)} = 0 \quad (63)$$

$$\gamma^{(3)} = 0 \quad (64)$$

which leads to $$\epsilon^* = \epsilon \quad (65)$$

$$\delta^* = \delta \quad (66)$$

$$\Gamma^* = 0. \quad (67)$$

The final formula for the effective elastic parameters for VTI media (as previously presented in U.S. Pat. No. 6,901,333) are:

$$\ln \tilde{V}_P^{eff} = \ln \tilde{V}_P + \epsilon \quad (68)$$

$$\ln \tilde{\rho}^{eff} = \ln \rho - \epsilon \quad (69)$$

$$\ln \tilde{V}_S^{eff} = \ln \tilde{V}_S + 1/8K[(4K+1)\epsilon - \delta]. \quad (70)$$

Returning now to the effective elastic parameters in orthorhombic, any elastic parameter E has a corresponding effective elastic parameter $E^{eff}$ expressed as:

$$E^{eff} = \epsilon_r^{(2)X} \delta_r^{(3)Y} \gamma_r^{(3)Z} \epsilon_r^{(1)U} \delta_r^{(1)V} \delta_r^{(2)W} E \quad (71)$$

with $\ln \epsilon_r^{(2)} = \epsilon^{(2)}$, $\ln \delta_r^{(3)} = \delta^{(3)}$, $\ln \gamma_r^{(3)} = \gamma^{(3)}$, $\ln \epsilon_r^{(1)} = \epsilon^{(1)}$, $\ln \delta_r^{(1)} = \delta^{(1)}$, $\ln \delta_r^{(2)} = \delta^{(2)}$.

For the effective elastic parameters in TTI medium, any elastic parameter E has a corresponding effective elastic parameter $E^{eff}$ expressed as:

$$E^{eff} = \epsilon_r^X \delta_r^Y \gamma_r^Z E \quad (72)$$

with $\epsilon_r^X$, $\delta_r^Y$, $\gamma_r^Z$ defined by equations (26), (27) and (28). Exponents X, Y, Z, U, V, W from equations (71) and (72) are independent from the elastic parameters and Thomsen parameters, but they may depend on K. It should be noted that these exponents are different for each of the elastic parameters and for each type of anisotropy.

Alternatively, the above effective elastic parameters for both orthorhombic and TTI media may be expressed as:

$$\ln E^{eff} = b_0 + b_2 \cos(2(\omega-\varphi)) + b_4 \cos(4(\omega-\varphi)) \quad (73)$$

coefficients $b_0$, $b_2$ and $b_4$ depending on both elastic and Thomsen parameters, and additionally to the tilt angle $\tau$ in the case of TTI media. These coefficients are different for each elastic parameter and each type of anisotropy.

All of the above-derived formulas for effective elastic parameters are valid for arbitrary contrasts of azimuthal orientations for both orthorhombic and TTI anisotropy cases, and also valid for arbitrary contrast of tilt orientation for a TTI anisotropy case.

Figure 6:
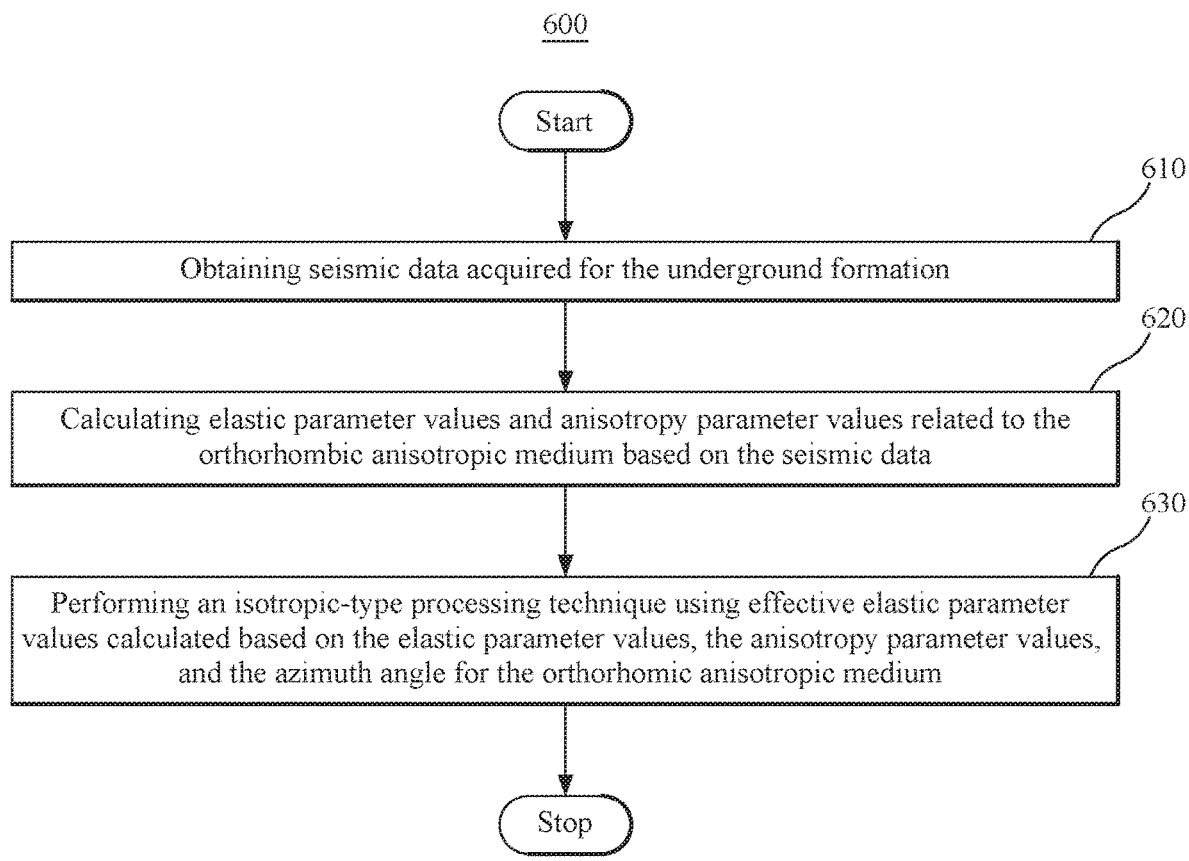
FIG. 6 is a flowchart of a method for seismic exploration of an underground formation including an orthorhombic anisotropic medium according to an embodiment.

FIG. 6 is a flowchart illustrating a method 600 for seismic exploration of an underground formation including an orthorhombic anisotropic medium according to an embodiment. At 610, method 600 includes obtaining seismic data acquired for the underground formation, wherein the seismic data includes seismic amplitudes detected at plural values of an azimuth angle, $\omega-\varphi$, of a source-receiver direction relative to a principal axis of the orthorhombic anisotropic medium. Method 600 further includes calculating elastic parameter values and anisotropy parameter values related to the orthorhombic anisotropic medium based on the seismic data at 620. The calculated values may include values for $V_P$, $V_{S||}$, $\rho$, $\epsilon^{(1)}$, $\epsilon^{(2)}$, $\delta^{(1)}$, $\delta^{(2)}$, $\delta^{(3)}$, $\gamma^{(3)}$, $\omega$, $\varphi$. These values may be obtained via conventional seismic data processing, where offset and azimuth-dependent time shifts are indicative of changes in the propagation velocity. Additionally, at the position of the well borehole, one can perform additional seismic experiments to specifically recover TTI and/or orthorhombic parameters. Such experiments are known as walk-away and walk-around VSP (Vertical Seismic Profiling).

Method 600 further includes performing an isotropic-type processing technique using effective elastic parameter values at 630. The effective elastic parameter values are calculated based on the elastic parameter values, the anisotropy parameter values, and the azimuth angle (as in equations (14), (15) and (16)). The isotropic-type processing technique leads to a quantitative model of the underground formation usable to locate hydrocarbon reservoirs. That is, the output of the isotropic-type processing technique is a quantitative model of the orthorhombic anisotropic medium within the orthorhombic anisotropic medium.

The isotropic-type processing technique may be an isotropic seismic modeling method, an isotropic seismic analysis and interpretation method, an isotropic seismic wavelet estimation method, an isotropic seismic inversion method, or an isotropic method for analysis and interpretation of inversion results to produce processed effective elastic parameter data.

An elastic parameter E may have a corresponding effective elastic parameter $E^{eff}$ expressed as in equation (71). Alternatively, a elastic parameter E may have a corresponding effective elastic parameter $E^{eff}$ expressed as in equation (73). The elastic parameters values may represent p-wave velocity, s-wave velocity and density. Alternatively, the elastic parameters values may represent p-wave impedance, s-wave impedance and density.

Figure 7:
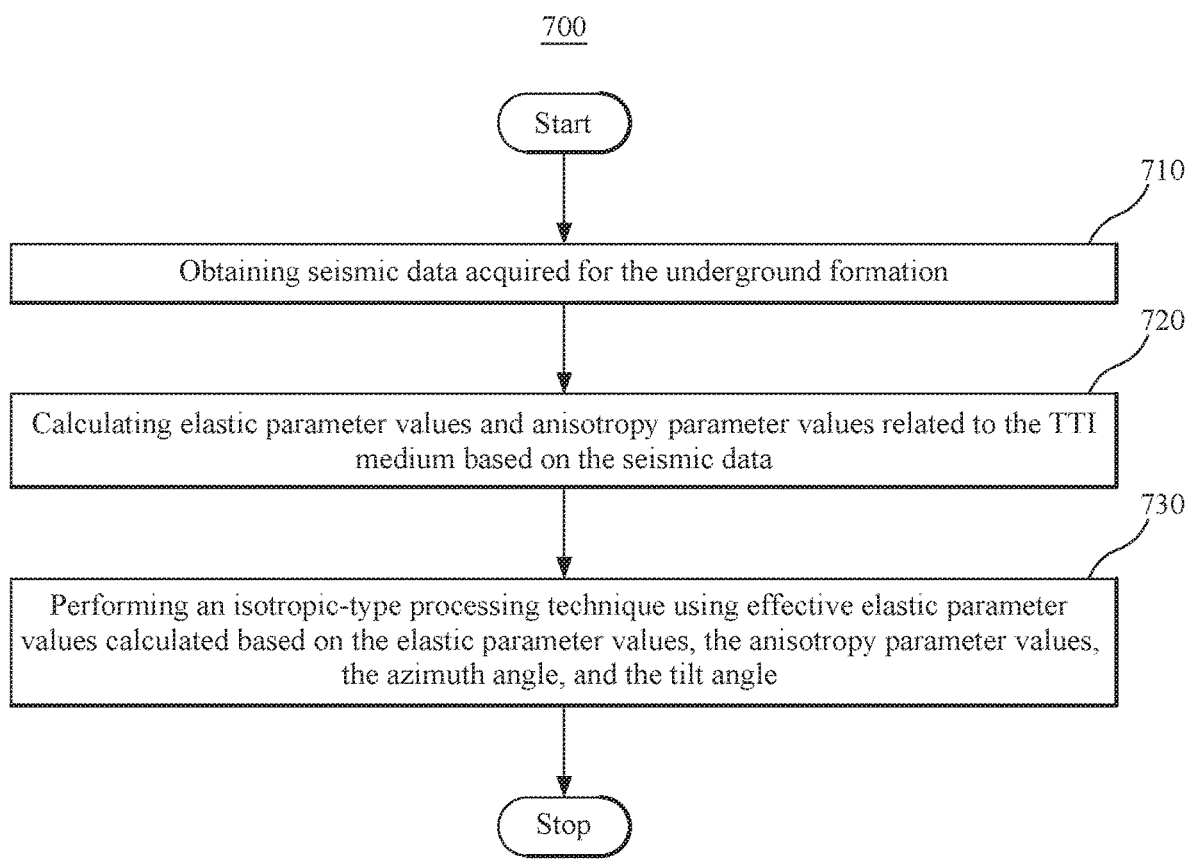
FIG. 7 is a flowchart of a method for seismic exploration of an underground formation including an orthorhombic anisotropic medium according to an embodiment.

FIG. 7 is a flowchart illustrating a method 700 for seismic exploration of an underground formation including a TTI medium having a symmetry axis tilted at a tilt angle $\tau$ relative to a horizontal plane thereof according to an embodiment. Method 700 includes obtaining seismic data acquired for the underground formation at 710. Here, the seismic data includes seismic amplitudes detected at plural values of an azimuth angle, $\omega-\varphi$, of a source-receiver direction relative to a projection of the symmetry axis in the horizontal plane.

Method 700 further includes calculating elastic parameter values and anisotropy parameter values related to the TTI medium based on the seismic data at 720. Step 720 is similar to step 620 of method 600. The calculated values may include values for $V_P$, $V_{S\parallel}$, $\rho$, $\epsilon^{(V)}$, $\delta^{(V)}$, $\omega$, $\varphi$, $\tau$.

Method 700 further includes performing an isotropic-type processing technique using effective elastic parameter values at 730. The effective elastic parameter values are calculated based on the elastic parameter values, the anisotropy parameter values, the values of the azimuth angle and of the tilt angle (equations (51), (52), (53)). As in the case of method 600, the isotropic-type processing technique leads to quantitative model of the underground formation usable to locate hydrocarbon reservoirs.

The isotropic-type processing technique in methods 600 and 700 may be an isotropic seismic modeling method to synthesize anisotropic seismic data. Additionally, the synthesized anisotropic seismic data may be used in an isotropic seismic analysis and interpretation method for analysis and interpretation of anisotropic seismic data. Accordingly, the azimuthal effective elastic parameter data may be substituted for the isotropic elastic parameters in any of the above-mentioned methods.

Another embodiment is directed to a method for approximating anisotropic seismic modeling by applying isotropic seismic modeling. The method includes an initial step of inputting earth elastic parameter data and earth anisotropy parameter data for an area of interest. Next, the earth elastic parameter data is transformed to obtain effective elastic parameter data based on the earth anisotropy parameter data. Isotropic seismic modeling is then applied to the transformed effective elastic parameter data. The resulting modeled anisotropic seismic data is an approximation of seismic data obtained by a corresponding anisotropic seismic modeling. The processed anisotropic seismic data is then output. The method may further include a step of substituting the effective elastic parameter data for isotropic elastic parameter data to synthesize the anisotropic seismic data. The synthesized anisotropic seismic data may be used in an isotropic analysis and interpretation method for analysis and interpretation of the anisotropic seismic data. The area of interest may be imaged by acquisition of borehole data, wide azimuth (WAZ) data, three-dimension (3D) earth models, or four-dimensional (4D) earth models. This step of transforming may further include applying appropriate transform functions that convert the earth elastic parameter data and earth anisotropy parameter data to the effective elastic parameter data.

Figure 8:
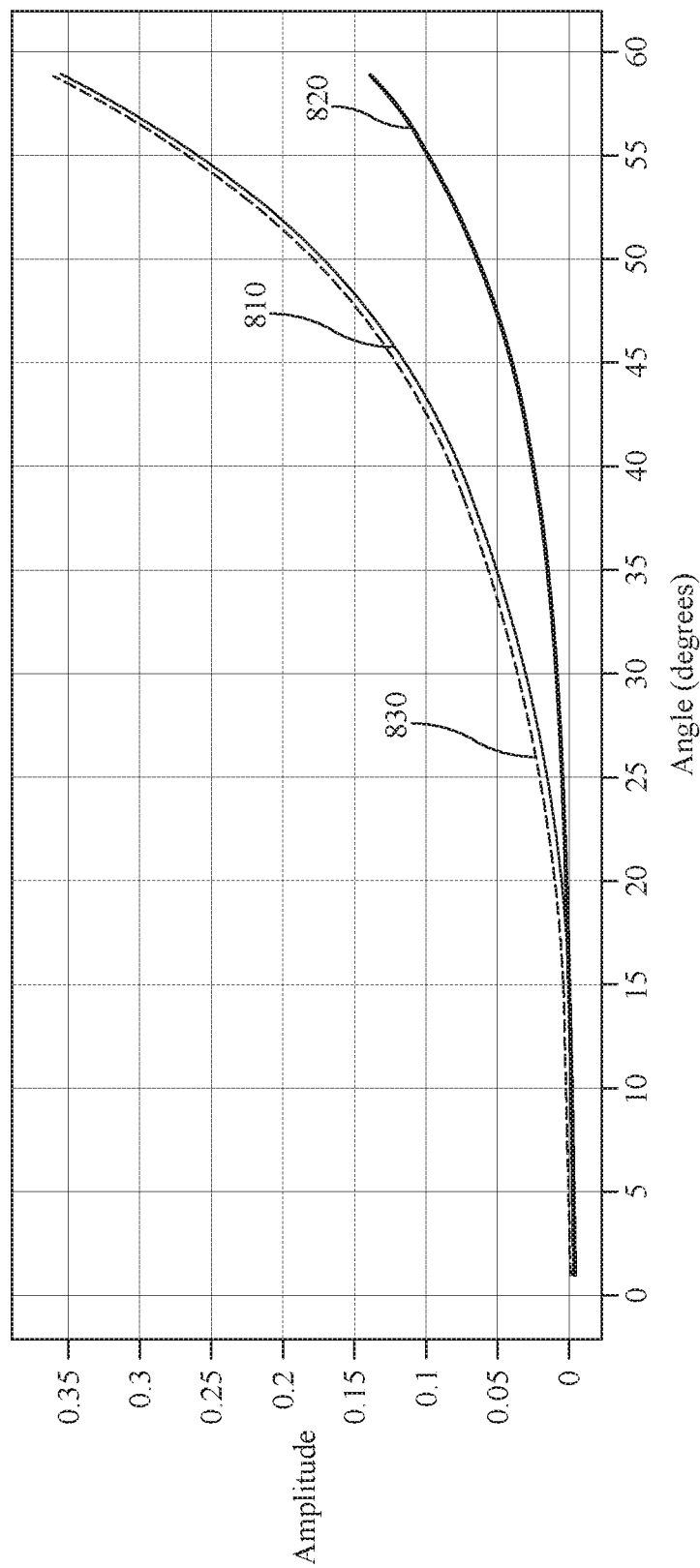
FIGS. 8 and 9 are graphs illustrating results of applying methods according to embodiments.
Figure 9:
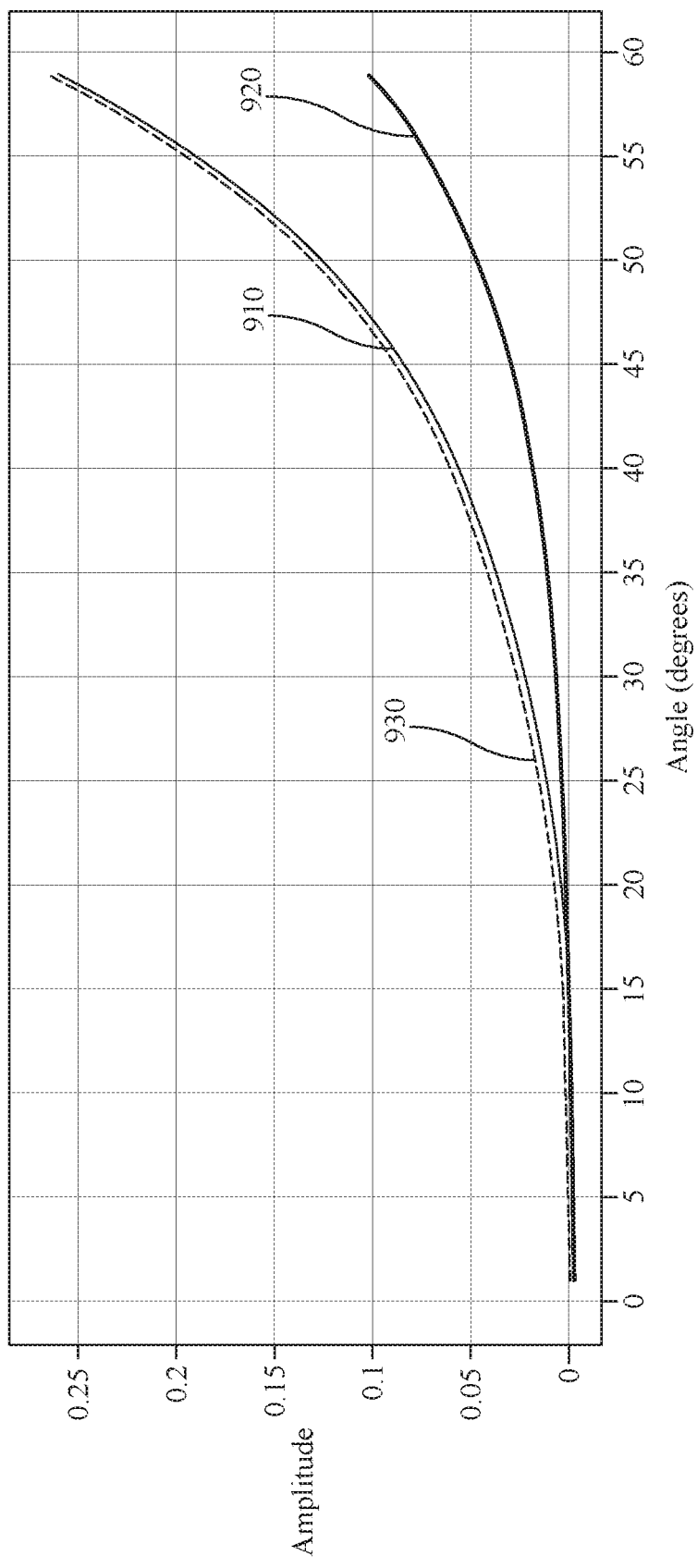

FIGS. 8 and 9 illustrate modeling results for layers with relatively strong anisotropy contrasts. FIG. 8 illustrates the effect of using the 3-term approximation for the Zoeppritz equations described above for TTI media, wherein curve 810 (thin line) shows the anisotropic response and curve 820 (thick line) shows the isotropic response. In addition, curve 830 (dotted line) shows the result of isotropic modeling with the effective elastic parameters specified in the table under the graph, where $V_P^{eff}$, $V_S^{eff}$ and $\rho^{eff}$ are the anisotropic elastic primary wave velocity, shear wave velocity and density, respectively, calculated from the transform expressions (51), (52) and (53). The results show that isotropic modeling with the effective elastic parameters closely approximates anisotropic modeling.

FIG. 9 illustrates the similar results as the ones in FIG. 8 (i.e., curve 910 is the anisotropic response, curve 920 is the isotropic response and curve 930 is the result of isotropic modeling with the effective elastic parameters), but for the orthorhombic anisotropy case. The effective elastic parameter values calculated with equations (14), (15) and (16) are shown in the table under the graph. Again, the results illustrate that isotropic modeling with the effective elastic parameters closely approximates anisotropic modeling.

Thus, the graphs in FIGS. 8 and 9 show that the approximation of anisotropic modeling using the effective elastic parameters defined for orthorhombic and TTI media in isotropic modeling is accurate.

The equations (71) for orthorhombic and (72) for TTI cases show that the transform functions have parameters that control the transforms. In some cases, appropriate values for these transform parameters can be obtained analytically. However, in another embodiment, an iterative procedure can also be readily followed to obtain appropriate values for the transform parameters. This implies further important benefits such as: exact modeling methods rather than 3-term approximations can be used as reference for the case of the simple single flat interface model, or more complex modeling methods can be applied; and other transform functions with other functional forms and with other transform parameters than equations (71) and (72) can be applied to evaluate if a better approximation can be obtained.

Figure 10:
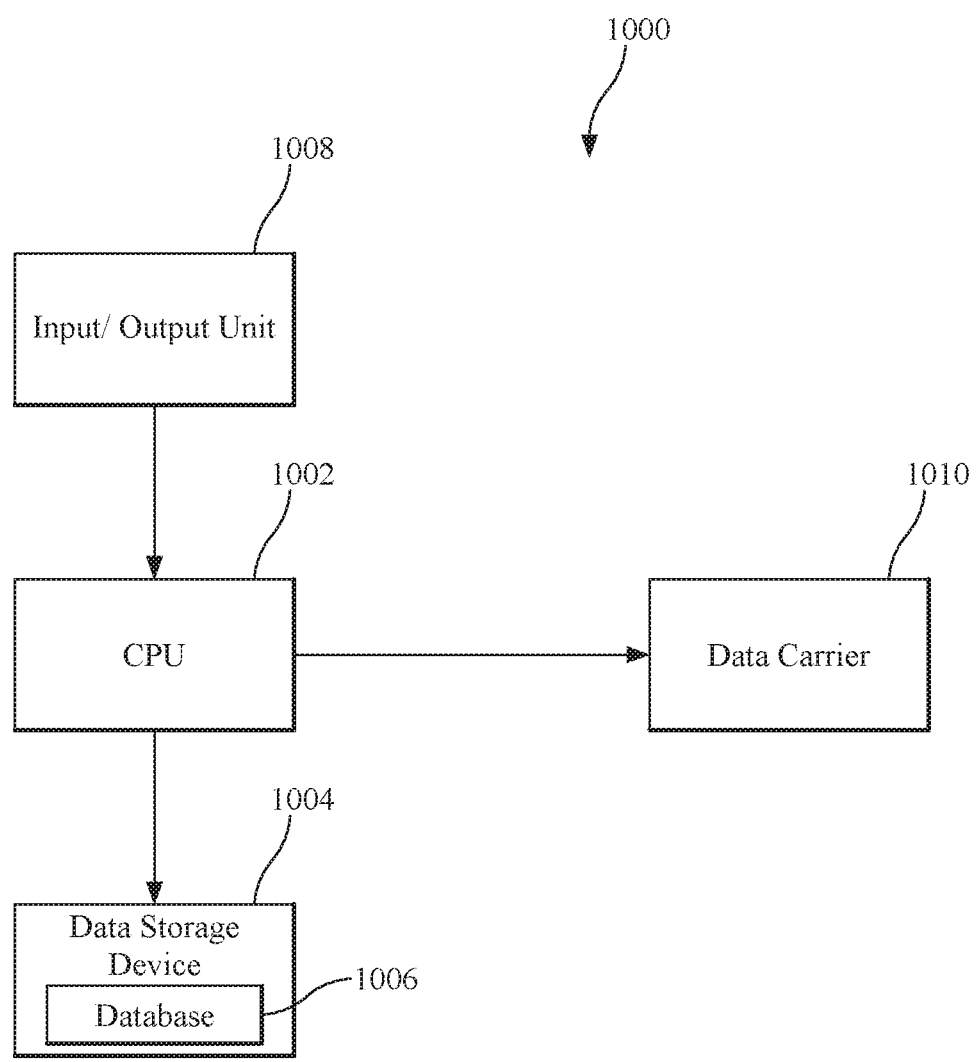
FIG. 10 is a block diagram of a seismic data processing apparatus according to an embodiment.

FIG. 10 is a block diagram of a seismic data processing apparatus 1000 according to an embodiment. Apparatus 1000 includes a CPU 1002, a data storage device 1004 (that may include a database 1006), and an interface 1008. Interface 1008 is configured to obtain seismic data acquired for the underground formation. The CPU is configured to perform methods similar to 600 and/or 700 described above. The CPU may include a software or hardware interface to a computer readable recording medium such as the data storage device 1004 or an external device. The computer readable recording medium stores executable codes, which, when executed by the CPU, make the CPU perform methods similar with 600 and 700 described above.

Embodiments described in this section may perform in the context of an arbitrary stack of layers with different anisotropy types (e.g., orthorhombic, TTI, VTI and/or HTI).

The disclosed embodiments provide methods and systems for seismic exploration of an underground formation including an orthorhombic anisotropic medium or a TTI medium. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of an underground formation including an orthorhombic anisotropic medium with three mutually orthogonal planes of symmetry, the method comprising:
   obtaining seismic data acquired for the underground formation, wherein the seismic data includes seismic amplitudes detected at plural values of an azimuth angle of a source-receiver direction relative to a principal axis of the orthorhombic anisotropic medium;
   calculating elastic parameter values and anisotropy parameter values related to the orthorhombic anisotropic medium based on the seismic data;
   calculating effective elastic parameter values for the orthorhombic anisotropic medium based on the elastic parameter values, the anisotropy parameter values and the azimuth angle, each elastic parameter E having a corresponding effective elastic parameter $E^{eff}$ expressed as:

$$E^{eff} = \epsilon_r^{(2)X} \delta_r^{(3)Y} \gamma_r^{(3)Z} \epsilon_r^{(1)U} \delta_r^{(1)V} \delta_r^{(2)W} E$$

wherein $\epsilon_r^{(2)}, \delta_r^{(3)}, \gamma_r^{(3)}, \epsilon_r^{(1)}, \delta_r^{(1)}, \delta_r^{(2)}$ are Thomson parameters, with (1), (2) and (3) indicating coordinate axes, and wherein X, Y, Z, U, V, W are constants;
   performing an isotropic-type processing technique using the effective elastic parameter values, the isotropic-type processing technique yielding a quantitative model of the underground formation; and
   locating hydrocarbon reservoirs based on the quantitative model of the underground formation.

2. The method of claim 1, wherein the isotropic-type processing technique includes at least one of:
   an isotropic seismic modeling method,
   an isotropic seismic analysis and interpretation method,
   an isotropic seismic wavelet estimation method,
   an isotropic seismic inversion method, and
   an isotropic method for analysis and interpretation of inversion results to produce processed effective elastic parameter data.

3. The method of claim 1, wherein the elastic parameters values represent p-wave velocity, s-wave velocity and density.

4. The method of claim 1, wherein the elastic parameters values represent p-wave impedance, s-wave impedance and density.

5. A method for seismic exploration of an underground formation including a tilted transverse isotropic, TTI, medium having a symmetry axis tilted at a tilt angle $\tau$ relative to a horizontal plane thereof, the method comprising:
   obtaining seismic data acquired for the underground formation, wherein the seismic data includes seismic amplitudes detected at plural values of an azimuth angle, $\omega-\varphi$, of a source-receiver direction relative to a projection of the symmetry axis in a horizontal plane;
   calculating elastic parameter values and anisotropy parameter values related to the TTI medium based on the seismic data; and
   performing an isotropic-type processing technique using effective elastic parameter values calculated based on the elastic parameter values, the anisotropy parameter values, the values of the azimuth angle and of the tilt angle for the TTI medium, the isotropic-type processing technique yielding a quantitative model of the underground formation; and
   locating hydrocarbon reservoirs using the quantitative model of the underground formation.

6. The method of claim 5, wherein the isotropic-type processing technique includes at least one of:
   an isotropic seismic modeling method,
   an isotropic seismic analysis and interpretation method,
   an isotropic seismic wavelet estimation method,
   an isotropic seismic inversion method, and
   an isotropic method for analysis and interpretation of inversion results to produce processed effective elastic parameter data.

7. The method of claim 5, wherein any elastic parameter E has a corresponding effective elastic parameter $Eef^{eff}$ expressed as:

$$E^{eff} = \epsilon_r^X \delta_r^Y \gamma_r^Z E$$

wherein $\epsilon_r^X, \delta_r^Y, \gamma_r^Z$ being Thomsen parameters and X, Y, Z being constants.

8. The method of claim 5, wherein an elastic parameter E has a corresponding effective elastic parameter $Eef^{eff}$ expressed as:

$$\ln E^{eff} = b_0 + b_2 \cos(2(\omega-\varphi)) + b_4 \cos(4(\omega-\varphi))$$

wherein $b_0$, $b_2$ and $b_4$ are coefficients depending on the elastic parameter values, the anisotropy parameter values and the tilt angle.

9. The method of claim 5, wherein the elastic parameters values represent p-wave velocity, s-wave velocity and density.

10. The method of claim 5, wherein the elastic parameters values represent p-wave impedance, s-wave impedance and density.

11. A seismic data processing apparatus for exploration of an underground formation, the apparatus comprising:
    an interface configured to obtain seismic data acquired for the underground formation, wherein the seismic data includes seismic amplitudes detected at plural values of an azimuth angle, $\omega-\varphi$, of a source-receiver direction relative to a principal axis of the orthorhombic anisotropic medium if the underground formation includes an orthorhombic anisotropic medium, or relative to a projection of a symmetry axis in a horizontal plane, if the underground formation includes a tilted transverse isotropic, TTI, medium having a symmetry axis tilted at a tilt angle $\tau$ relative to an isotropy plane thereof; and
    a central processing unit, CPU, which has one or more processors and is connected to the interface, the CPU being configured to calculate elastic parameter values and anisotropy parameter values related to the orthorhombic anisotropic medium or to the TTI medium based on the seismic data;

to calculate effective elastic parameter values, wherein the effective elastic parameter values are based on the elastic parameter values, the anisotropy parameter values and the azimuth angle, for the orthorhombic anisotropic medium, and the effective elastic parameter values are based on the elastic parameter values, the anisotropy parameter values, the azimuth angle and the tilt angle for TTI medium, to perform an isotropic-type processing technique using the effective elastic parameter values, the isotropic-type processing technique yielding a quantitative model of the underground formation, and to locate hydrocarbon reservoirs using the quantitative model of the underground formation.

12. The seismic data processing apparatus of claim 11, wherein the isotropic-type processing technique includes at least one of:
an isotropic seismic modeling method,
an isotropic seismic analysis and interpretation method,
an isotropic seismic wavelet estimation method,
an isotropic seismic inversion method, and
an isotropic method for analysis and interpretation of inversion results to produce processed effective elastic parameter data.

13. The seismic data processing apparatus of claim 11, wherein for the orthorhombic anisotropic medium, an elastic parameter E has a corresponding effective elastic parameter $E^{\textit{eff}}$ expressed as:

$$E^{\textit{eff}} = \epsilon_r^{(2)X} \delta_r^{(3)Y} \gamma_r^{(3)Z} \epsilon_r^{(1)U} \delta_r^{(1)V} \delta_r^{(2)W} E$$

wherein $\epsilon_r^{(2)}$, $\delta_r^{(3)}$, $\gamma_r^{(3)}$, $\epsilon_r^{(1)}$, $\delta_r^{(1)}$, $\delta_r^{(2)}$ are Thompsen parameters, with (1), (2,) and (3) indicating coordinate axes, and wherein X, Y, Z, U, V, W are constants.

14. The method of claim 11, wherein, for the TTI medium, any elastic parameter E has a corresponding effective elastic parameter $E^{\textit{eff}}$ expressed as:

$$E^{\textit{eff}} = \epsilon_r^X \delta_r^Y \gamma_r^Z E$$

wherein $\epsilon_r^X$, $\delta_r^Y$, $\gamma_r^Z$ being Thomsen parameters and X, Y, Z being constants.

15. The method of claim 11, wherein, an elastic parameter E has a corresponding effective elastic parameter $E^{\textit{eff}}$ expressed as:

$$\ln E^{\textit{eff}} = b_0 + b_2 \cos(2(\omega-\varphi)) + b_4 \cos(4(\omega-\varphi))$$

wherein $b_0$, $b_2$ and $b_4$ are coefficients depending on a combination of the elastic parameter values, the anisotropy parameter values and the tilt angle.

16. The seismic data processing apparatus of claim 11, wherein the elastic parameters values represent p-wave velocity, s-wave velocity and density.

17. The seismic data processing apparatus of claim 11, wherein the elastic parameters values represent p-wave impedance, s-wave impedance and density.

18. The seismic data processing apparatus of claim 11, wherein the CPU includes an interface to a non-transitory computer readable recording medium storing executable codes, which, when executed by the CPU, make the CPU to calculate the elastic parameter values and the anisotropy parameter values, to calculate the effective elastic parameter values and to perform an isotropic-type processing technique using the effective elastic parameter values.

* * * * *